United States Patent
Fortuyn et al.

(10) Patent No.: US 6,306,953 B1
(45) Date of Patent: Oct. 23, 2001

(54) POLY(ARYLENE ETHER)-POLYSTYRENE COMPOSITION

(75) Inventors: Johannes E. Fortuyn; Juraji Liska, both of Bergen op Zoom (NL)

(73) Assignee: General Electric Co., Pittsfield, MA (US)

( * ) Notice: Subject to any disclaimer, the term of this patent is extended or adjusted under 35 U.S.C. 154(b) by 0 days.

(21) Appl. No.: 09/504,829

(22) Filed: Feb. 16, 2000

(51) Int. Cl.$^7$ ................................................ C08L 71/12
(52) U.S. Cl. .................... 524/508; 524/502; 525/92 R
(58) Field of Search ............................ 524/502, 508, 524/505; 525/92 R

(56) References Cited

U.S. PATENT DOCUMENTS

| | | | |
|---|---|---|---|
| 4,528,281 | * | 7/1985 | Sutt, Jr. ........................ 502/402 |
| 5,001,214 | | 3/1991 | White et al. . |
| 5,089,091 | | 2/1992 | Fox et al. . |
| 5,147,722 | * | 9/1992 | Koslow et al. ................ 428/402 |
| 5,331,037 | * | 7/1994 | Koslow et al. ................ 524/496 |
| 5,382,627 | | 1/1995 | Yoshimura et al. . |
| 5,907,051 | * | 5/1999 | Matsuda et al. ............... 558/270 |

FOREIGN PATENT DOCUMENTS

| | | |
|---|---|---|
| 0 643 014 A1 | 3/1995 | (EP) . |
| 0480 244 B1 | 12/1999 | (EP) . |
| 2 295 155 A | 5/1996 | (GB) . |
| 02-209943A | 8/1990 | (JP) . |
| 02209943 * | 8/1990 | (JP) . |
| 02-265959A | 10/1990 | (JP) . |
| 02-265960A | 10/1990 | (JP) . |
| 02-265961A | 10/1990 | (JP) . |
| 03-152155 | 6/1991 | (JP) . |
| 03-153755A | 7/1991 | (JP) . |
| 06-065497A | 8/1992 | (JP) . |
| 07-041659A | 7/1993 | (JP) . |
| 07-138466A | 5/1995 | (JP) . |
| 09279013 A | 10/1997 | (JP) . |
| 11080536 | 3/1999 | (JP) . |
| 2000047431 | 2/2000 | (JP) . |

OTHER PUBLICATIONS

Columbian Chemicals Company, "Raven Blacks", 10/99, pp. 1–6.

Shinjo et al. Caplus AN 1991:166116.*

* cited by examiner

*Primary Examiner*—Jeffrey Mullis

(57) ABSTRACT

Reduced emissions of styrene and butanal are exhibited by thermoplastic compositions comprising poly(arylene ether), a polystyrene resin, optionally rubber, and an activated carbon derived from vegetable matter. The thermoplastic compositions are particularly useful for molding automobile interior parts.

18 Claims, No Drawings

POLY(ARYLENE ETHER)-POLYSTYRENE COMPOSITION

BACKGROUND OF THE INVENTION

The present invention relates to poly(arylene ether)-polystyrene compositions, and especially relates to poly(arylene ether)-polystyrene compositions having reduced volatile emissions and reduced odor.

There has long been a desire to reduce volatile emissions from thermoplastics, especially thermoplastics used in interior spaces. This desire arise from both aesthetic and toxicological concerns. Considerable effort has been invested in reducing odor and volatile emissions from poly(arylene ether) containing thermoplastics, and various solutions have been proposed.

U.S. Pat. No. 5,001,214 to White et al. describes preparation of reduced-odor poly(phenylene ether) from a purified phenolic monomer and an amine-free catalyst. U.S. Pat. No. 5,089,091 to Fox et al. describes mixing a poly(phenylene ether) resin with water to form and aqueous suspension, then distilling off the water to remove volatile impurities. Japanese patent publication number JP07-138466 describes a reduced-odor composition comprising poly(phenylene ether) resin, carbon black, and a synthetic zeolite. Japanese patent publication number JP09-279013 describes a conductive, reduced-odor composition comprising poly(phenylene ether), polystyrene, carbon black, and an aromatic carboxylic acid hydride.

There remains a need for thermoplastic compositions with reduced volatile emissions.

BRIEF SUMMARY OF THE INVENTION

Reduced emissions of styrene and butanal are exhibited by a thermoplastic composition comprising: (a) about 5 to about 95 weight percent of a poly(arylene ether); (b) about 5 to about 95 weight percent of a polystyrene; (c) optionally, about 0.1 to about 15 weight percent of a rubber material; and (d) about 0.1 to about 10 weight percent of an activated carbon derived from vegetable matter and having a surface area of about 200 to about 2,000 square meters per gram ($m^2/g$); wherein all weight percents are based on the weight of the entire composition.

DETAILED DESCRIPTION OF THE INVENTION

The thermoplastic composition comprises: (a) about 5 to about 95 weight percent of a poly(arylene ether); (b) about 5 to about 95 weight percent of a polystyrene; (c) optionally, about 0.1 to about 15 weight percent of a rubber material; and (d) about 0.1 to about 10 weight percent of an activated carbon derived from vegetable matter and having a surface area of about 200 to about 2,000 $m^2/g$; wherein all weight percents are based on the weight of the entire composition.

The composition comprises at least one poly(arylene ether) resin. Although all conventional poly(arylene ether)s can be employed with the present invention, polyphenylene ethers ("PPE") are preferred. Poly(arylene ether)s per se, are known polymers comprising a plurality of structural units of the formula:

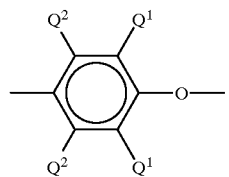

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer poly(arylene ether)s are included. The preferred homopolymers are those containing 2,6-dimethylphenylene ether units. Suitable copolymers include random copolymers containing, for example, such units in combination wit 2,3,6-trimethyl1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether)s in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The poly(arylene ether)s generally have a number average molecular weight of about 3,000 to about 40,000 and a weight average molecular weight of about 20,000 to about 80,000, as determined by gel permeation chromatography. The poly(arylene ether) generally has an intrinsic viscosity of about 0.10 to about 0.60 deciliters per gram (dL/g), preferably about 0.29 to about 0.48 dL/g, all as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

The poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90 weight percent of the polymer, may contain at least one of said aminoalkyl-containing and 4-hydroxybiphenyl end groups.

It will be apparent to those skilled in the art from the foregoing that the poly(arylene ether)s include all those presently known, irrespective of variations in structural units or ancillary chemical features.

A suitable amount of poly(arylene ether) in the composition is about 5 to about 95 weight percent, with a preferred amount being about 20 to about 80 weight percent. An amount of about 25 to about 75 weight percent is more preferred.

The composition further comprises at least one polystyrene. The term "polystyrene" as used herein includes polymers prepared by methods known in the art including bulk, suspension and emulsion polymerization, which contain at least 25 weight percent of structural units derived from a monomer of the formula:

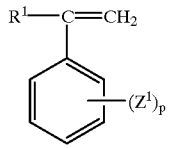

wherein $R^1$ is hydrogen, lower alkyl having from 1 to about 7 carbon atoms, or halogen; $Z^1$ is vinyl, halogen or lower alkyl having from 1 to about 7 carbon atoms; and p is from 0 to 5. These resins include homopolymers of styrene, chlorostyrene and vinyltoluene; random copolymers of styrene with one or more monomers illustrated by acrylonitrile, butadiene, alpha-methylstyrene, ethylvinylbenzene, divinylbenzene and maleic anhydride; and rubber-modified polystyrenes comprising blends and grafts, wherein the rubber is a polybutadiene or a rubbery copolymer of about 70 to about 98 weight percent styrene and about 2 to about 30 weight percent diene monomer; and the like and combinations and reaction products comprising at least one of the foregoing. Polystyrenes are known to be miscible with poly(arylene ether)s in all proportions, and the composition may contain polystyrene in an amount of about 5 to about 95 weight percent, preferably about 25 to about 75 weight percent, more preferably about 40 to about 60 weight percent, based on the weight of the entire composition.

The composition optionally further comprises at least one rubber material. Suitable rubber materials include those comprising a styrenic block copolymer. Styrenic block copolymers suitable for the polymer compositions comprise blocks built up from a vinyl aromatic compound, for example, styrene, and blocks built up from an olefinic compound, for example butadiene, ethylene, propylene and the like, as well as combinations comprising at least one of the foregoing. Suitable are linear block copolymers, radial teleblock copolymers and so-called "tapered" block copolymers (i.e. block copolymers built up from blocks which are bonded together via a "random" copolymer of the vinyl aromatic compound and (hydrogenated) diene compound), and the like as well as combinations comprising at least one of the foregoing. The styrenic block copolymers may be unsaturated, i.e., they may contain residual olefinic unsaturation. Alternatively, the styrenic block copolymers may be saturated, i.e., they may be essentially free of olefinic unsaturation.

Suitable unsaturated styrenic block copolymers may have number average molecular weights of about 50,000 to about 200,000, with molecular weights of about 80,000 to about 150,000 being preferred, and molecular weights of about 100,000 to about 130,000 being more preferred. The unsaturated styrenic block copolymer may be present in an amount of about 0.1 to about 10 weight percent, preferably about 0.3 to about 5 weight percent, more preferably about 0.5 to about 2 weight percent, based on the weight of the entire composition. Suitable saturated styrenic block copolymers may have number average molecular weights of about 50,000 to about 500,000, with molecular weights of about 100,000 to about 400,000 being preferred and molecular weights of about 200,000 to about 300,000 being more preferred. The saturated styrenic block copolymers may be present in an amount of about 1 to about 15 weight percent, preferably about 3 to about 10 weight percent, more preferably about 5 to about 8 weight percent, based on the weight of the entire composition.

Suitable styrenic block copolymers are commercially available from a number of sources, including Phillips Petroleum under the trademark SOLPRENE®, Shell Chemical Company under the trademark KRATON®, and Kuraray under the trademark SEPTON®. Suitable materials include the unsaturated styrenic block copolymers in the KRATON® D series (styrene-butadiene-styrene (SBS) and styrene-isoprene-styrene (SIS)), and the saturated styrenic block copolymers in the KRATON® G series (styrene-ethylene/butylene-styrene (SEBS) and styrene-ethylene/propylene-styrene, (SEPS)). Especially preferred are the materials sold as KRATON® G 1650 and 1651.

The composition further includes an activated carbon derived from vegetable matter. Preferred activated carbons include those derived from coconut shell. While activated carbons with surface areas of about 200 to about 2,000 m²/g are suitable, preferred surface areas are about 400 to about 1,200 m²/g, with surface areas of about 400 to about 1,000 m²/g being more preferred, and surface areas of about 600 to about 800 m²/g being even more preferred. Representative materials suitable for use are the coconut shell activated carbons sold by Sutcliffe Speakman Carbons under the trade name Odourcarb as 205CP and 203CP.

The activated carbon can be used in the composition in an amount effective to reduce the odor of the composition. The amount of activated carbon is generally in the range of about 0.1 to about 10 weight percent, preferably about 1 to about 5 weight percent, more preferably about 1 to about 3 weight percent, based on the weight of the entire composition.

In addition to the components described above, the composition preferably contains one or more antioxidants. Suitable antioxidants include organophosphites, for example, tris(nonyl-phenyl)phosphite, tris (2,4-di-t-butylphenyl) phosphite, bis(2,4-di-t-butylphenyl)pentaerythritol diphosphite or distearyl pentaerythritol diphosphite or the like; hindered phenols, such as alkylated monophenols, polyphenols and alkylated reaction products of polyphenols with dienes, such as, for example, tetrakis[methylene (3,5-di-tert-butyl-4-hydroxyhydrocinnamate)]methane, 3,5-di-tert-butyl-4-hydroxyhydrocinnamate octadecyl, butylated reaction products of para-cresol and dicyclopentadiene, alkylated hydroquinones, hydroxylated thiodiphenyl ethers, alkylidene-bisphenols, O—, N— and S—benzyl compounds, such as, for example, 3,5,3', 5'-tetra-tert.-butyl-4,4'-dihydroxydibenzyl ether, octadecyl 4-hydroxy-3,5-dimethylbenzyl-mercaptoacetate, tris-(3,5-di-tert.-butyl-4-hydroxybenzyl) -amine and bis-(4-tert.-butyl-3-hydroxy-2,6-dimethylbenzyl) dithioterephthalate, esters of beta-(3,5-di-tert.-butyl-4-hydroxyphenyl)-propionic acid with monohydric or polyhydric alcohols, esters of beta-(5-tert.-butyl-4-hydroxy-3-methylphenyl)-propionic acid with monohydric or polyhydric alcohols, amides of beta-(3,5-di-tert.-butyl-4-hydroxyphenyl)- propionic acid, and hindered phenol-substituted triazine triones such as 1,3,5-tris(3,5-di-tert.-butyl-4-hydroxybenzyl)-s-triazinetrione and the like; and esters of thioalkyl or thioaryl compounds, such as, for example, distearylthiopropionate, dilaurylthiopropionate, ditridecylthiodipropionate and the like; as well as combinations comprising at least one of the foregoing. Preferred antioxidants include organophosphites and hindered phenols. Highly preferred antioxidants include tetrakis [methylene (3,5-di-tert.-butyl-4-hydroxyhydrocinnamate)] methane sold by Ciba Specialty Chemicals under the trademark IRGANOX® as IRGANOX® 1010, and 1,3,5-tris (3,5-di-tert.-butyl-4-hydroxybenzyl)-s-triazinetrione sold by Ciba Specialty Chemicals under the trademark IRGANOX® as IRGANOX® 3114, as well as antioxidant combinations comprising at least one of these.

The antioxidant, when employed, may be present in an amount of about 0.1 to about 3 weight percent, preferably about 0.25 to about 2.5 weight percent, more preferably about 0.5 to about 2 weight percent, based on the weight of the entire composition.

The composition may also comprise various additives such as flame retardants, stabilizers, pigments, reinforcing agents, processing aids, plasticizers, and the like.

Different inorganic additives may be used in poly(arylene ether) resins as reinforcing agents, heat stabilizers, colorants (organic and inorganic pigments, dyes) and electroconductive additives. Some representative examples cover the compounds such as various types of silicas and aluminas, zeolites, aluminum hydroxide, magnesium hydroxides, titanium dioxide, potassium titanate and titanate whiskers, calcium carbonate, calcium sulfates, kaolin, talc, wollastonite, limestone products, mica, barium sulfate, carbon fibers and fibrils, carbon blacks, glass beads and fibers, etc. Such additives can be used in the amounts of about 0.1 to about 50 weight percent, preferably about 0.5 to about 20 weight percent, and more preferably about 1 to about 5 weight percent.

Many stabilizers used in plastics can be part of a poly (arylene ether) formulation, e.g. UV stabilizers, radical and hydroperoxide scavengers such as hindered phenols, hindered amines, benzofuranones, benzotriazoles, benzophenones, hydroxylamines, organic phosphites and phosphates, thioethers, thioesters, zinc oxide, zinc sulfide, and the like, as well as combinations comprising at least one of the foregoing.

Other additives which can be used in the composition include: lubricants to enhance mold release and flow such as metallic stearates, hydrocarbons (including mineral oil, polyolefines and Teflon), fatty acids and fatty alcohols; exothermic and/or endothermic blowing agents; halogen based, metal hydrate based or phosphorous based flame retardants; plasticizers which increase flexibility, workability and distensibility such as glutarates, adipates, azelates, sebacates, phthalates, and the like; and adhesion promoters (epoxies, phenolics, acrylates, terpenes, etc); and the like, as well as combinations comprising at least one of the foregoing.

The composition can be prepared by combining the poly(arylene ether), the polystyrene, the rubber compound, and the activated carbon, as well as any optional ingredients, using any of the known compounding equipment and procedures. For example, a dry pre-blend of all ingredients can be formed; the pre-blend can be heated to a temperature sufficient to cause melting (e.g., at about 250° C. to 350° C.); and the melted pre-blend can be extruded in a single or twin screw extruder. The extruded material can be chopped, cut or ground to smaller size and injection molded (e.g., about 250° C. to 320° C.) to desired shape and size. Alternatively, the various components can be blended at different times during the extrusion process. Steam stripping and vacuum venting may advantageously be used during the compounding and/or extruding steps to remove the generated volatiles.

All cited patents are incorporated herein by reference.

The invention is further illustrated by the following non-limiting example.

EXAMPLE

Formulations A–J were prepared from a common base formulation consisting of 40 weight percent poly(phenylene ether) having intrinsic viscosity 0.4 (chloroform, 250° C.) obtained as PPO® 803 from GE Plastics; 30 weight percent crystal clear polystyrene, number average molecular weight 180,000, obtained as Lacqrene 1810 from Elf Atochem; 6.5 weight percent KRATON® G 1651 (a styrene-ethylene/butylene-styrene or SEBS polymer, number average molecular weight=270,000, obtained from Shell Chemical Co.); 10 weight percent glass fiber, diameter of 14 micrometers, obtained as CS122Y 14P from Owens-Corning; as well as a standard set of additives consisting of antioxidants, stabilizers, an adhesion promoter, and a release agent.

As specified in the Table, formulations A–J varied with respect to the type and amount of carbon black. Carbon black types are described below.

CB1: a petroleum-derived carbon black supplied by Cabot BV as ELFTEX® 470; dibutyl phthalate (DBP) oil absorption 109 to 119 milliliter per 100 g (mL/100 g); surface area 126 to 146 $m^2/g$; pH 5.5 to 9.5; ash 0.5%; sieve residue 325 mesh 0.02%.

CB2: a coconut shell-derived activated carbon supplied by Sutcliffe Speakman Carbons, Ltd. as Odourcarb 208CP; carbon tetrachloride absorption 60 to 70 percent by weight; surface area 1100 to 1200 $m^2/g$; hardness 95 to 99%; pH 9 to 11; ash 2 to 5%; particle size 90% less than or equal to 0.075 mm.

CB3: a coconut shell-derived activated carbon supplied by Sutcliffe Speakman Carbons, Ltd. as Odourcarb 205CP; carbon tetrachloride absorption 40–50 percent by weight; surface area 800 to 1000 m²/g; hardness 96 to 99%; pH 9 to 11; ash 2 to 5%; particle size 90% less than or equal to 0.075 mm.

CB4: a coconut shell-derived activated carbon supplied by Sutcliffe Speakman Carbons, Ltd. as Odourcarb 203CP; carbon tetrachloride absorption 30 to 40 weight percent; surface area 600 to 800 m²/g; hardness 95 to 99%; pH 9 to 11; ash 2 to 5%; particle size 90% less than or equal to 0.075 mm.

Ingredients were dry-blended on a PapenMeyer mixer and the resultant formulation was extruded on a twin screw 28 mm Werner-Pfleiderer extruder at 300° C. using steam stripping and vacuum venting. The extrudate was chopped into pellets and molded on a Stork 90T injection molding machine at a temperature of 285° C. into test specimens. The test specimens were used to measure emission.

Emission tests were conducted using headspace gas chromatography according to the procedure described in VDA Recommendation 277 published by the Organization of the German Automobile Industry (VDA). A total of two grams of sample material, in pieces ranging from about 10 to about 25 milligrams, was cut from a molded disc, and heated for 5 hours at 120° C. in a 20 milliliter headspace vial. The released vapor was analyzed by gas chromatography with flame ionization detection (FID). All peak areas were integrated and from the total peak area the emission was calculated and expressed in units of microgram carbon per gram material (µgC/g). Calibration was performed with an external standard of acetone in n-butanol.

Formulation variations and test results are presented in the Table.

that steam stripping a formulation with coconut shell activated carbon reduces styrene and butanal emissions even further.

Thus, the experiment shows that compositions of the invention with activated carbon derived from vegetable matter enable reduced styrene and butanal emissions, as well as reduced total emissions, compared to compositions containing either no added carbon or a petroleum-derived carbon black. It is especially surprising that as the surface area of the activated carbon was varied, lower activated carbon surface areas were associated with lower emissions from the composition. It should also be noted that the reduced emissions were achieved without sacrificing the physical performance of the composition.

What is claimed is:

1. A thermoplastic composition, comprising:
   (a) about 20 to about 80 weight percent of a poly(arylene ether);
   (b) about 5 to about 80 weight percent of a polystyrene;
   (c) about 0.1 to about 15 weight percent of a rubber material; and
   (d) from about 0.1 to about 10 weight percent of an activated carbon derived from vegetable matter and having a surface area of about 200 to about 2,000 m²/g;
   wherein all weight percents are based on the weight of the entire composition.

2. The thermoplastic composition of claim 1, wherein the activated carbon is derived from coconut shells.

3. The thermoplastic composition of claim 1, wherein the activated carbon has a surface area of about 400–1,200 m²/g.

4. The thermoplastic composition of claim 1, wherein the poly(arylene ether) comprises a plurality of structural units of the formula:

TABLE

| | FORMULATION | | | | | | | | | | | |
|---|---|---|---|---|---|---|---|---|---|---|---|---|
| | A | B | C | D | E | F | G | H | I | J | K | L |
| COMPOSITION | | | | | | | | | | | | |
| carbon black type and amount (wt %) | none | CB1, 0.5 | CB1, 1.0 | CB1, 1.5 | CB2, 1.0 | CB2, 2.0 | CB2, 3.0 | CB3, 1.0 | CB3, 3.0 | none | CB3, 3.0 | CB4, 3.0 |
| steam stripping? | no | no | no | no | no | no | no | no | no | yes | yes | yes |
| EMISSION | | | | | | | | | | | | |
| total (µgC/g) | 107.0 | 86.0 | 95.0 | 87.0 | 86.0 | 83.0 | 71.0 | 72.0 | 60.0 | 77.0 | 90.0 | 73.0 |
| styrene (µgC/g) | 27.6 | 27.1 | 25.1 | 25.2 | 17.5 | 8.5 | 3.6 | 13.7 | 2.4 | 23.0 | 1.5 | 0.8 |
| butanal (µgC/g) | 13.1 | 12.7 | 13.3 | 13.5 | 7.9 | 4.7 | 2.2 | 8.0 | 2.3 | 11.6 | 1.3 | 0.6 |

Comparison of results for formulations A and J demonstrate that steam stripping reduced total emissions and styrene and butanal emissions, even when the formulation contains no activated carbon. Comparison of results for formulations C, E, and H (all containing 1 weight percent activated carbon) show that values for all three emission measurements were lower for the samples containing coconut shell-derived activated carbon than for samples containing the petroleum-derived activated carbon. Comparison of results for samples K and L (as well as for G and I), shows, quite unexpectedly, that among the coconut shell activated carbons, lower surface areas were associated with lower emissions. Finally, comparison of examples I and K shows

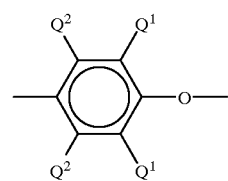

wherein for each structural unit, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

5. The thermoplastic composition of claim 1, wherein the polystyrene comprises at least 25 weight percent of structural units derived from a monomer of the formula:

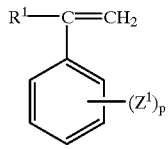

wherein $R^1$ is hydrogen, lower alkyl or halogen; $Z^1$ is vinyl, halogen or lower alkyl; and p is from 0 to about 5.

6. The thermoplastic composition of claim 1, wherein the rubber material is a block copolymer selected from the group consisting of styrene-butadiene-styrene, styrene-isoprene-styrene, styrene-ethylene/butylene-styrene, and styrene-ethylene/propylene-styrene and combinations comprising at least one of the foregoing.

7. The thermoplastic composition of claim 1, further comprising about 0.1 to about 3 weight percent of an antioxidant.

8. An article molded from the composition of claim 1.

9. An automobile interior part molded from the composition of claim 1.

10. The thermoplastic composition of claim 1, wherein the poly(arylene ether) comprises a copolymer of 2,6-dimethylphenol and 2,3,6-trimethylphenol.

11. A thermoplastic resin composition, comprising the reaction product of:
   (a) about 20 to about 80 weight percent of a poly(arylene ether);
   (b) about 5 to about 80 weight percent of a polystyrene;
   (c) optionally, about 0.1 to about 15 weight percent of a rubber material; and
   (d) about 0.1 to about 10 weight percent of an activated carbon derived from vegetable matter and having a surface area of about 200 to about 2,000 $m^2/g$;
   wherein all weight percents are based on the weight of the entire composition.

12. The thermoplastic composition of claim 11, wherein the poly(arylene ether)comprises a copolymer of 2,6-dimethylphenol and 2,3,6-trimethylphenol.

13. A method for making a thermoplastic composition, comprising:
   dry-blending about 20 to about 80 weight percent of a poly(arylene ether); about 5 to about 80 weight percent of a polystyrene; optionally, about 0.1 to about 15 weight percent of a rubber material; and about 0.1 to about 10 weight percent of an activated carbon derived from vegetable matter and having a surface area of about 200 to about 2,000 $m^2/g$, wherein all weight percents are based on the weight of the entire composition;
   melting the dry-blended composition; and
   extruding the melted composition.

14. The method of claim 13, wherein the extruding the melted composition steam stripping, vacuum venting, or steam stripping and vacuum venting.

15. The method of claim 13, wherein the pre-blend is extruded at a temperature of about 250° C. to about 350° C.

16. The method of claim 13, wherein the activated carbon is derived from coconut shells.

17. The method of claim 13, wherein the activated carbon has a surface area of about 600 to about 800 $m^2/g$.

18. The method of claim 13, wherein the poly(arylene ether) comprises a copolymer of 2,6-dimethylphenol and 2,3,6-trimethylphenol.

* * * * *